United States Patent
Gates et al.

(10) Patent No.: US 10,091,231 B1
(45) Date of Patent: Oct. 2, 2018

(54) SYSTEMS AND METHODS FOR DETECTING SECURITY BLIND SPOTS

(71) Applicant: Symantec Corporation, Mountain View, CA (US)

(72) Inventors: Chris Gates, Venice, CA (US); Stanislav Miskovic, San Jose, CA (US); Michael Hart, Farmington, CT (US); Kevin Roundy, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 254 days.

(21) Appl. No.: 15/266,320

(22) Filed: Sep. 15, 2016

(51) Int. Cl.
    *H04L 29/06* (2006.01)
(52) U.S. Cl.
    CPC ...... *H04L 63/1433* (2013.01); *H04L 63/1408* (2013.01); *H04L 63/1425* (2013.01); *H04L 63/20* (2013.01); *H04L 67/42* (2013.01)
(58) Field of Classification Search
    CPC . H04L 63/1433; H04L 63/20; H04L 63/1408; H04L 63/1416; H04L 63/1441; H04L 63/1425; H04L 67/42; G06F 2221/2101
    See application file for complete search history.

(56) References Cited

U.S. PATENT DOCUMENTS

| | | | |
|---|---|---|---|
| 7,281,270 B2 * | 10/2007 | Piesco | G06F 21/552 726/22 |
| 7,352,280 B1 | 4/2008 | Rockwood | |
| 8,214,905 B1 | 7/2012 | Doukhvalov et al. | |
| 8,266,698 B1 * | 9/2012 | Seshardi | G06F 21/53 726/22 |
| 8,775,333 B1 * | 7/2014 | Zahn | G06F 21/552 706/12 |
| 8,839,435 B1 | 9/2014 | King | |
| 9,098,706 B1 | 8/2015 | Kennedy | |
| 9,215,244 B2 * | 12/2015 | Ayyagari | H04W 12/06 |
| 9,270,467 B1 | 2/2016 | Chen et al. | |

(Continued)

OTHER PUBLICATIONS

Kevin Alejandro Roundy, et al; Systems and Methods for Detecting Security Threats; U.S. Appl. No. 15/084,522, filed Mar. 30, 2016.

(Continued)

*Primary Examiner* — Linglan E Edwards
(74) *Attorney, Agent, or Firm* — FisherBroyles, LLP

(57) ABSTRACT

The disclosed computer-implemented method for detecting security blind spots may include (i) detecting, via an endpoint security program, a threat incident at a set of client machines associated with a security vendor server, (ii) obtaining an indication of how the set of client machines will respond to the detecting of the threat incident, (iii) predicting how a model set of client machines would respond to the threat incident, (iv) determining that a delta exceeds a security threshold, and (v) performing a security action by the security vendor server, in response to determining that the delta exceeds the security threshold, to protect the set of client machines at least in part by electronically notifying the set of client machines of information about the prediction of how the model set of client machines would respond to the threat incident. Various other methods, systems, and computer-readable media are also disclosed.

20 Claims, 7 Drawing Sheets

(56) References Cited

U.S. PATENT DOCUMENTS

| | | | |
|---|---|---|---|
| 9,413,780 | B1 | 8/2016 | Kaplan et al. |
| 9,485,272 | B1 | 11/2016 | Roundy |
| 9,491,187 | B2 * | 11/2016 | Sridhara ............. H04L 63/1408 |
| 9,509,707 | B2 * | 11/2016 | Patne .................. H04L 63/1416 |
| 9,705,914 | B2 * | 7/2017 | Di Pietro ............ H04L 63/1458 |
| 9,747,440 | B2 * | 8/2017 | Gupta ..................... G06F 21/55 |
| 9,792,169 | B2 | 10/2017 | Seigel |
| 9,838,405 | B1 | 12/2017 | Guo et al. |
| 2002/0083070 | A1 | 6/2002 | Shuster |
| 2005/0283837 | A1 | 12/2005 | Olivier et al. |
| 2006/0230451 | A1 | 10/2006 | Kramer et al. |
| 2006/0242712 | A1 | 10/2006 | Linn et al. |
| 2006/0253548 | A1 | 11/2006 | Vitanov et al. |
| 2007/0240217 | A1 | 10/2007 | Tuvell et al. |
| 2008/0086772 | A1 | 4/2008 | Chesla |
| 2009/0089290 | A1 | 4/2009 | Nachenberg et al. |
| 2009/0217370 | A1 | 8/2009 | Hulten et al. |
| 2010/0083376 | A1 | 4/2010 | Pereira et al. |
| 2010/0228852 | A1 | 9/2010 | Gemelos et al. |
| 2012/0233698 | A1 | 9/2012 | Watters et al. |
| 2013/0074143 | A1 | 3/2013 | Bu et al. |
| 2014/0096246 | A1 | 4/2014 | Morrissey et al. |
| 2014/0223566 | A1 | 8/2014 | Zaitsev |
| 2014/0283066 | A1 | 9/2014 | Teddy et al. |
| 2015/0074806 | A1 | 3/2015 | Roundy et al. |
| 2015/0128263 | A1 | 5/2015 | Raugas et al. |
| 2015/0207813 | A1 | 7/2015 | Reybok et al. |
| 2015/0372976 | A1 | 12/2015 | Lonas et al. |
| 2016/0072836 | A1 | 3/2016 | Hadden et al. |
| 2016/0080400 | A1 | 3/2016 | Sim et al. |
| 2016/0292419 | A1 | 10/2016 | Langton et al. |

OTHER PUBLICATIONS

ArcSight; http://www8.hp.com/us/en/software-solutions/arcsight-express-siem-appliance/tech-specs.html?jumpid=reg_r1002_usen_c-001_title_r0002, as accessed Apr. 25, 2014; Hewlett-Packard Development Company, L.P., 2014.

Association rule learning; https://en.wikipedia.org/wiki/Association_rule_learning, as accessed Mar. 2, 2016; Wikipedia.

Fanglu Guo, et al; Systems and Methods for Determining Types of Malware Infections on Computing Devices; U.S. Appl. No. 14/947,878, filed Nov. 20, 2015.

Kevin Alejandro Roundy; Systems and Methods for Estimating Confidence Scores of Unverified Signatures; U.S. Appl. No. 14/307,477, filed Jun. 18, 2014.

Kevin Roundy, et al; Systems and Methods for Determining the Trustworthiness of Files Within Organizations; U.S. Appl. No. 14/753,051, filed Jun. 29, 2015.

Kevin Roundy, et al; Systems and Methods for Identifying Non-Malicious Files on Computing Devices Within Organizations; U.S. Appl. No. 14/750,342, filed Jun. 25, 2015.

Yu; Alert Confidence Fusion in Intrusion Detection Systems with Extended Dempster-Shafer Theory; http://citeseerx.ist.psu.edu/viewdoc/download;jsessionid=FF6509FDC7A1D361CA4AFC293FA41159?doi=10.1.1.188.1103&rep=rep1&type=pdf, as accessed Apr. 25, 2014; 43rd ACM Southeast Conference, Kennesaw, GA, USA, (Mar. 18-20, 2005).

Liwei (Vivian) Kuang; DNIDS: A Dependable Network Intrusion Detection System Using the CSI-KNN Algorithm; https://qspace.library.queensu.ca/bitstream/1974/671/2/Kuang_Liwei_200709_MSc.pdf, as accessed Apr. 25, 2014; A thesis submitted to the School of Computing in conformity with the requirements for the degree of Master of Science, Queen's University, Kingston, Ontario, Canada; Sep. 7, 2016.

Nate Lord; Common Malware Types: Cybersecurity 101; https://www.veracode.com/blog/2012/10/common-malware-types-cybersecurity-101, as accessed Sep. 21, 2015; Veracode; Oct. 12, 2012.

Managed Security Services; http://www.symantec.com/managed-security-services/, as accessed Sep. 21, 2015; Symantec Corporation; On or before Sep. 21, 2015.

Naive Bayes classifier; https://en.wikipedia.org/wiki/Naive_Bayes_classifier, as accessed Sep. 21, 2015; Wikipedia; Jan. 31, 2005.

Probabilistic classification; https://en.wikipedia.org/wiki/Probabilistic_classification, as accessed Sep. 21, 2015; Wikipedia; Aug. 7, 2014.

Stack Overflow; http://stackoverflow.com/, as accessed May 13, 2015; Stack Exchange Inc; Mar. 1, 2000.

Yelp; http://www.yelp.com/, as accessed May 13, 2015; Nov. 28, 1996.

Chris Gates et al.; Systems and Methods for Personalizing Security Incident Reports; U.S. Appl. No. 15/292,874, filed Oct. 13, 2016.

ArcSight; http://www8.hp.com/us/en/software-solutions/arcsight-express-siem-appliance/tech-specs.html?jumpid=reg_r1002_usen_c-001_title_r0002, as accessed Apr. 25, 2014; Hewlett-Packard Development Company, L.P.; 2014.

Association rule learning; https://en.wikipedia.org/wiki/Association_rule_learning, as accessed Mar. 2, 2016; Wikipedia; Apr. 15, 2005.

Kuang, Liwei (Vivian); DNIDS: A Dependable Network Intrusion Detection System Using the CSI-KNN Algorithm; https://qspace.library.queensu.ca/bitstream/1974/671/2/Kuang_Liwei_200709_MSc.pdf, as accessed Apr. 25, 2014; A thesis submitted to the School of Computing in conformity with the requirements for the degree of Master of Science, Queen's University, Kingston, Ontario, Canada; Sep. 2007.

Lord, Nate; Common Malware Types: Cybersecurity 101; https://www.veracode.com/blog/2012/10/common-malware-types-cybersecurity-101, as accessed Sep. 21, 2015; VERACODE; Oct. 12, 2012.

Managed Security Services; http://www.symantec.com/managed-security-services/, as accessed Sep. 21, 2015; Symantec Corporation; published on or before. Sep. 21, 2015.

Stack Overflow; http://stackoverflow.com/, as accessed May 13, 2015; Stack Exchange Inc.; Mar. 1, 2000.

Yu, Dong et al.; Alert Confidence Fusion in Intrusion Detection Systems with Extended Dempster-Shafer Theory; http://citeseerx.ist.psu.edu/viewdoc/download;jsessionid=FF6509FDC7A1D361CA4AFC293FA41159?doi=10.1.1.188.1103&rep=rep1&type=pdf, as accessed Apr. 25, 2014; 43rd ACM Southeast Conference, Kennesaw, GA, USA; Mar. 18-20, 2005.

Suleiman Yerima et al., A New Android Malware Detection Approach Using Bayesian Classification, IEEE, 2013.

* cited by examiner

SYSTEMS AND METHODS FOR DETECTING SECURITY BLIND SPOTS

BACKGROUND

Security vendors are continuing to improve their products and services for protecting customers from threats against the customers' computing networks and resources. In some examples, security vendors are leveraging insights from one set of customers to help or protect another set of customers. For example, these vendors may collect telemetry data from a wide base of customers and then analyze the telemetry data to identify patterns, threats, vulnerabilities, and/or potential solutions.

Security vendors, like other service providers, may attempt to accommodate the requests and preferences of their customers. In some cases, however, the requests and preferences of the customers may be sub-optimal, as discussed further below. Accordingly, the instant disclosure identifies and addresses a need for systems and methods for detecting security blind spots.

SUMMARY

As will be described in greater detail below, the instant disclosure describes various systems and methods for detecting security blind spots. In one example, a computer-implemented method for detecting security blind spots may include (i) detecting, via an endpoint security program, a threat incident at a set of client machines associated with a security vendor server, (ii) obtaining an indication of how the set of client machines will respond to the detecting of the threat incident, (iii) predicting how a model set of client machines would respond to the threat incident by applying a feature vector that describes the threat incident to a trained supervised machine learning function that predicts how the model set of client machines would respond to threat incidents based on training data that labels actual previous responses by the model set of client machines to previous threat incidents, (iv) determining that a delta exceeds a security threshold, the delta indicating a difference between the obtained indication of how the set of client machines will respond to the detecting of the threat incident and the prediction of how the model set of client machines would respond to the threat incident, and (v) performing a security action by the security vendor server, in response to determining that the delta exceeds the security threshold, to protect the set of client machines at least in part by electronically notifying the set of client machines of information about the prediction of how the model set of client machines would respond to the threat incident.

In some examples, obtaining the indication of how the set of client machines will respond to the detecting of the threat incident may include receiving an indication of an actual previous response by the set of client machines. In some examples, obtaining the indication of how the set of client machines will respond to the detecting of the threat incident may include applying the feature vector that describes the threat incident to a trained supervised machine learning function that predicts how the set of client machines would respond to threat incidents based on training data that labels actual previous responses by the set of client machines to previous threat incidents.

In one embodiment, the set of client machines corresponds to one customer of a security vendor that manages the security vendor server and the security vendor selected the model set of client machines from customers of the security vendor. In a further embodiment, the model set of client machines are selected, from among a larger set of client machines associated with the security vendor server, based on a level of engagement with a security system provided by the security vendor server. In an additional embodiment, the model set of client machines are selected, from among a larger set of client machines associated with the security vendor server, based on a calculated degree of similarity to the set of client machines for which the indication is obtained. In an additional embodiment, the model set of client machines are selected, from among a larger set of client machines associated with the security vendor server, based on a relative security score that indicates a relative degree of security hygiene of the model set of client machines in comparison to other client machines in the larger set.

In one embodiment, electronically notifying the set of client machines of information about the prediction of how the model set of client machines would respond to the threat incident may include electronically notifying the set of client machines that the set of client machines is currently ignoring the threat incident even though other client machines in the model set of client machines addressed parallel instances of the threat incident. In a further embodiment, electronically notifying the set of client machines of information about the prediction of how the model set of client machines would respond to the threat incident may include electronically notifying the set of client machines that the threat incident leads to a specific negative security outcome identified through the training data. In an additional embodiment, electronically notifying the set of client machines of information about the prediction of how the model set of client machines would respond to the threat incident may include electronically notifying the set of client machines about further contextual information about other instances of the threat incident identified through the training data.

In one embodiment, a system for implementing the above-described method may include (i) a detection module, stored in memory, that detects, via an endpoint security program, a threat incident at a set of client machines associated with a security vendor server, (ii) an obtaining module, stored in memory, that obtains an indication of how the set of client machines will respond to the detecting of the threat incident, (iii) a prediction module, stored in memory, that predicts how a model set of client machines would respond to the threat incident by applying a feature vector that describes the threat incident to a trained supervised machine learning function that predicts how the model set of client machines would respond to threat incidents based on training data that labels actual previous responses by the model set of client machines to previous threat incidents, (iv) a determination module, stored in memory, that determines that a delta exceeds a security threshold, the delta indicating a difference between the obtained indication of how the set of client machines will respond to the detecting of the threat incident and the prediction of how the model set of client machines would respond to the threat incident, (v) a performance module, stored in memory as part of the security vendor server, that performs a security action, in response to determining that the delta exceeds the security threshold, to protect the set of client machines at least in part by electronically notifying the set of client machines of information about the prediction of how the model set of client machines would respond to the threat incident, and (vi) at least one physical processor configured to execute the detection module, the obtaining module, the prediction module, the determination module, and the performance module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) detect, via an endpoint security program, a threat incident at a set of client machines associated with a security vendor server, (ii) obtain an indication of how the set of client machines will respond to the detecting of the threat incident, (iii) predict how a model set of client machines would respond to the threat incident by applying a feature vector that describes the threat incident to a trained supervised machine learning function that predicts how the model set of client machines would respond to threat incidents based on training data that labels actual previous responses by the model set of client machines to previous threat incidents, (iv) determine that a delta exceeds a security threshold, the delta indicating a difference between the obtained indication of how the set of client machines will respond to the detecting of the threat incident and the prediction of how the model set of client machines would respond to the threat incident, and (v) perform a security action, in response to determining that the delta exceeds the security threshold, to protect the set of client machines at least in part by electronically notifying the set of client machines of information about the prediction of how the model set of client machines would respond to the threat incident.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
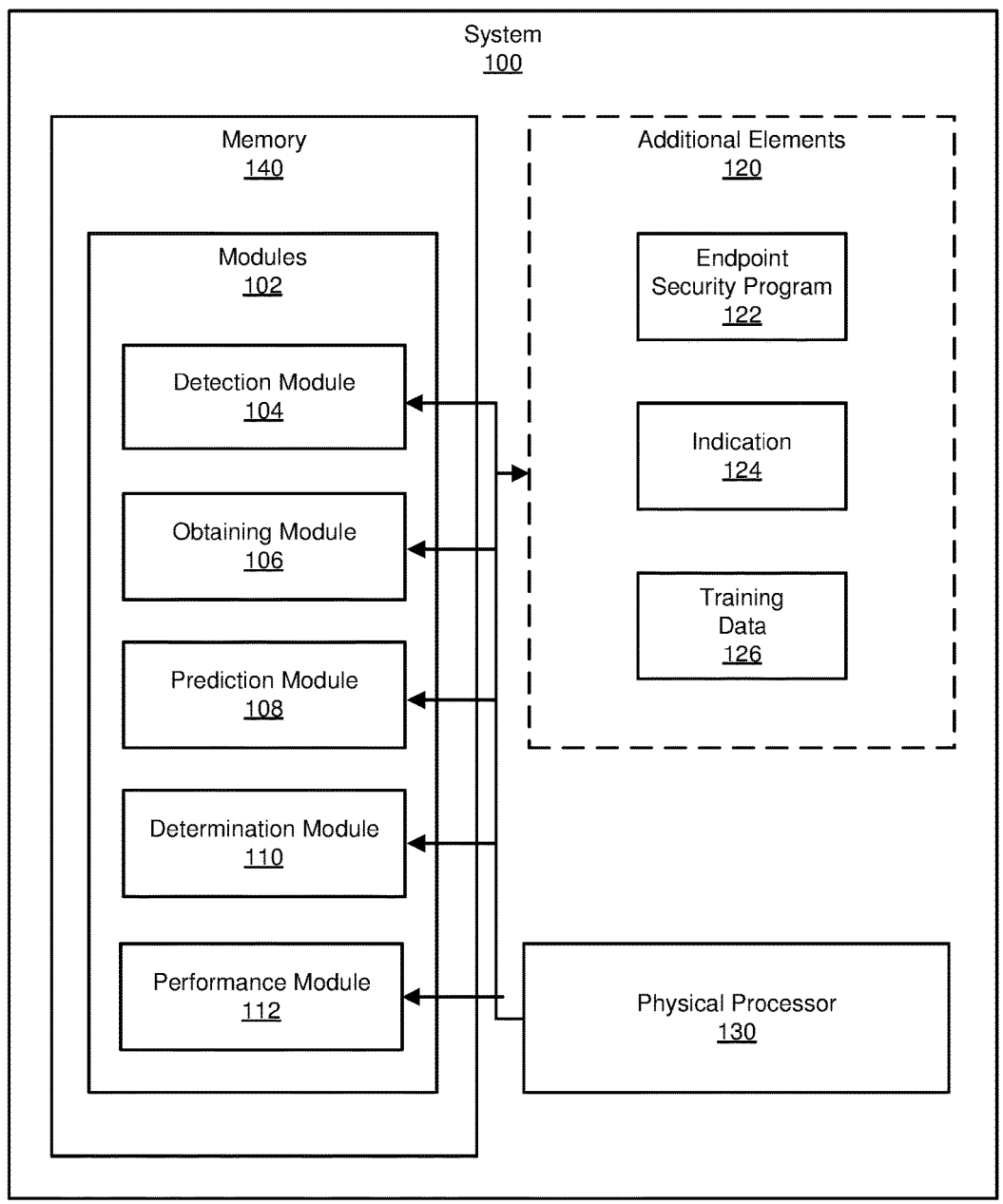
FIG. 1 is a block diagram of an example system for detecting security blind spots.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for detecting security blind spots. In general, the disclosed systems and methods may leverage telemetry information from one set of security vendor clients to provide insights and assistance to another set of security vendor clients. More specifically, the disclosed systems and methods may identify a model set of security vendor clients, train a supervised machine learning function to predict how the model set of security vendor clients will respond to various threat detections, as described by corresponding feature vectors, and then ascertain whether one or more clients are deviating from the predicted behavior of the model set of security vendor clients. In other words, even though one client may have one set of behaviors or preferences, the disclosed systems and methods may detect that the behaviors or preferences deviate, according to one or more statistical or machine learning measurements, from the behavior and preferences of other security vendor clients, including those security vendor clients that are selected based on one or more factors, including exceptional relative performance among other security vendor clients, exceptional security hygiene scores, and/or similarity to the other client(s) under evaluation. Accordingly, the disclosed systems and methods may thereby identify outliers and "blind spots" that a security vendor client is failing to identify, address, or resolve (e.g., because the security vendor client is not paying attention, because the security vendor client is not sufficiently engaged with the security system, and/or because the security vendor client has made a mistaken judgment call that the particular threat incident is innocuous or a false positive).

Figure 2:
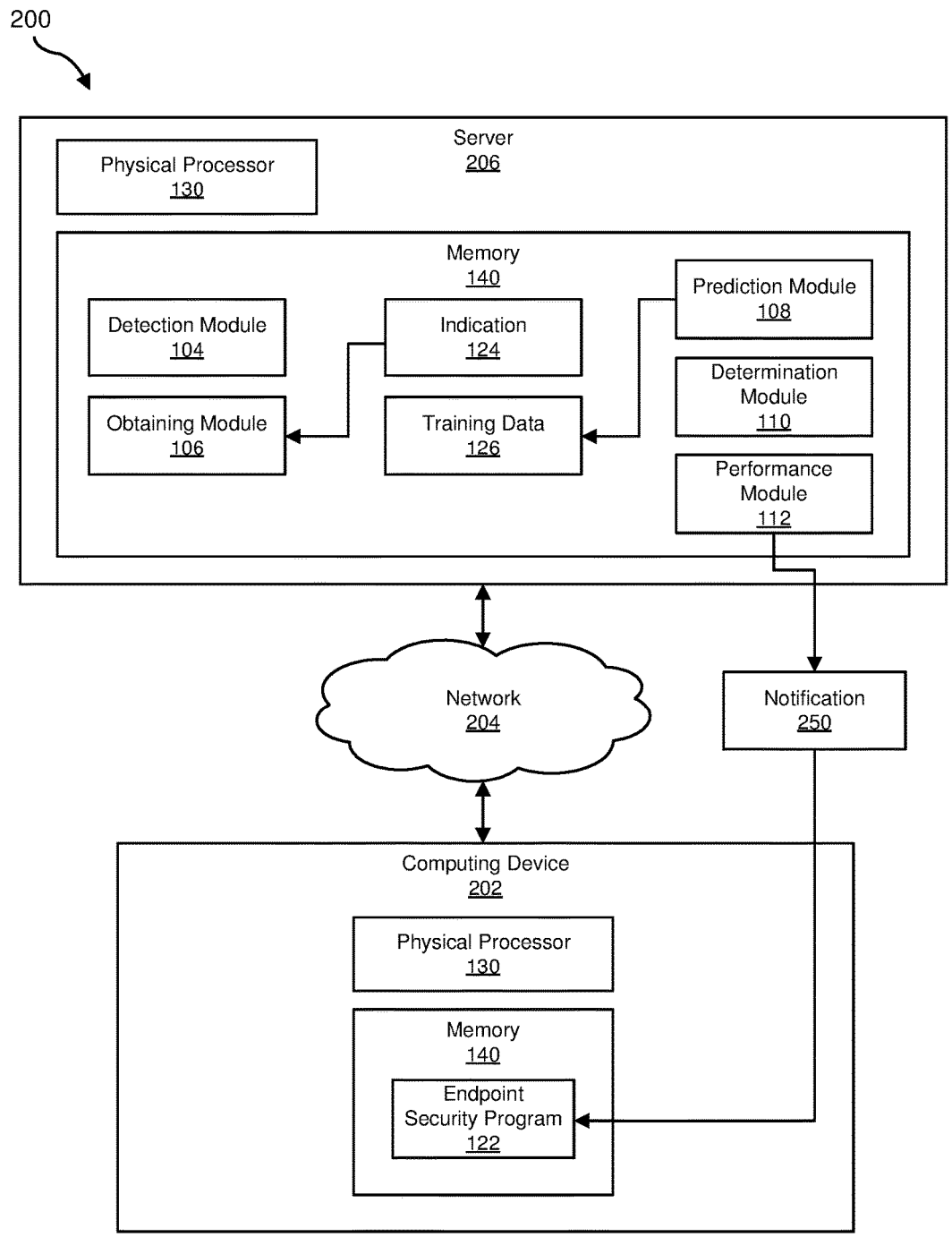
FIG. 2 is a block diagram of an additional example system for detecting security blind spots.

The following will provide, with reference to FIGS. 1-2, detailed descriptions of example systems for detecting security blind spots. Detailed descriptions of corresponding computer-implemented methods will also be provided in connection with FIGS. 3-5. In addition, detailed descriptions of an example computing system and network architecture capable of implementing one or more of the embodiments described herein will be provided in connection with FIGS. 6 and 7, respectively.

FIG. 1 is a block diagram of example system 100 for detecting security blind spots. As illustrated in this figure, example system 100 may include one or more modules 102 for performing one or more tasks. For example, and as will be explained in greater detail below, example system 100 may include a detection module 104 that detects, via an endpoint security program, a threat incident at a set of client machines associated with a security vendor server. Example system 100 may additionally include an obtaining module 106 that obtains an indication of how the set of client machines will respond to the detecting of the threat incident. Example system 100 may also include a prediction module 108 that predicts how a model set of client machines would respond to the threat incident by applying a feature vector that describes the threat incident to a trained supervised machine learning function that predicts how the model set of client machines would respond to threat incidents based on training data that labels actual previous responses by the model set of client machines to previous threat incidents.

Example system 100 may additionally include a determination module 110 that determines that a delta exceeds a security threshold. The delta may indicate a difference between the obtained indication of how the set of client machines will respond to the detecting of the threat incident and the prediction of how the model set of client machines would respond to the threat incident. Example system 100 may also include a performance module 112 that performs a security action, as part of the security vendor server, in response to determining that the delta exceeds the security threshold, to protect the set of client machines at least in part by electronically notifying the set of client machines of information about the prediction of how the model set of client machines would respond to the threat incident. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or security vendor server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate detecting security blind spots. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more additional elements 120. In general, additional elements 120 may correspond to data structures or variables with corresponding values that are stored within memory 140, as described above. Additional elements 120 may include an endpoint security program 122, which may detect the threat incident, as first outlined above. Furthermore, additional elements 120 may include an indication 124, which may correspond to the indication of how the set of client machines will respond to the threat incident. Furthermore, additional elements 120 may include training data 126, which may label how one or more client machines in the model set of client machines actually responded to previous threat incidents, and which may form the basis for training the supervised machine learning function, as discussed further below.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a security vendor server 206 via a network 204. In one example, all or a portion of the functionality of modules 102 may be performed by computing device 202, security vendor server 206, and/or any other suitable computing system. As will be described in greater detail below, one or more of modules 102 from FIG. 1 may, when executed by at least one processor of computing device 202 and/or security vendor server 206, enable computing device 202 and/or security vendor server 206 to detect security blind spots.

For example, and as will be described in greater detail below, detection module 104 may detect, via endpoint security program 122, a threat incident at a set of client machines associated with a security vendor server 206. The set of client machines may correspond to computing device 202, which may refer to a specific client machine where the threat incident was detected. Obtaining module 106 may obtain indication 124 of how the set of client machines will respond to the detecting of the threat incident. Prediction module 108 may predict how a model set of client machines would respond to the threat incident by applying a feature vector that describes the threat incident to a trained supervised machine learning function that predicts how the model set of client machines would respond to threat incidents based on training data 126 that labels actual previous responses by the model set of client machines to previous threat incidents. Determination module 110 may determine that a delta exceeds a security threshold. The delta may indicate a difference between the obtained indication 124 of how the set of client machines will respond to the detecting of the threat incident and the prediction of how the model set of client machines would respond to the threat incident. Performance module 112 may perform a security action, as part of security vendor server 206, to protect the set of client machines at least in part by electronically notifying the set of client machines, via a notification 250, of information about the prediction of how the model set of client machines would respond to the threat incident.

Computing device 202 generally represents any type or form of computing device capable of reading computer-executable instructions. In example embodiments, computing device 202 may correspond to any computing device owned and/or managed by a client or customer of a software or network security vendor. In these examples, computing device 202 may run client-side security software, such as endpoint security program 122. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, variations or combinations of one or more of the same, and/or any other suitable computing device.

Security vendor server 206 generally represents any type or form of computing device that is capable of facilitating the detection of security blind spots in accordance with method 300, as described further below. In example embodiments, security vendor server 206 corresponds to a backend server that collects telemetry data from a multitude of clients or customers and/or manages or facilitates the protection of client devices in coordination with endpoint security software, such as endpoint security program 122. Additional examples of server 206 include, without limitation, security servers, application servers, web servers, storage servers, and/or database servers configured to run certain software applications and/or provide various security, web, storage, and/or database services. Although illustrated as a single entity in FIG. 2, security vendor server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
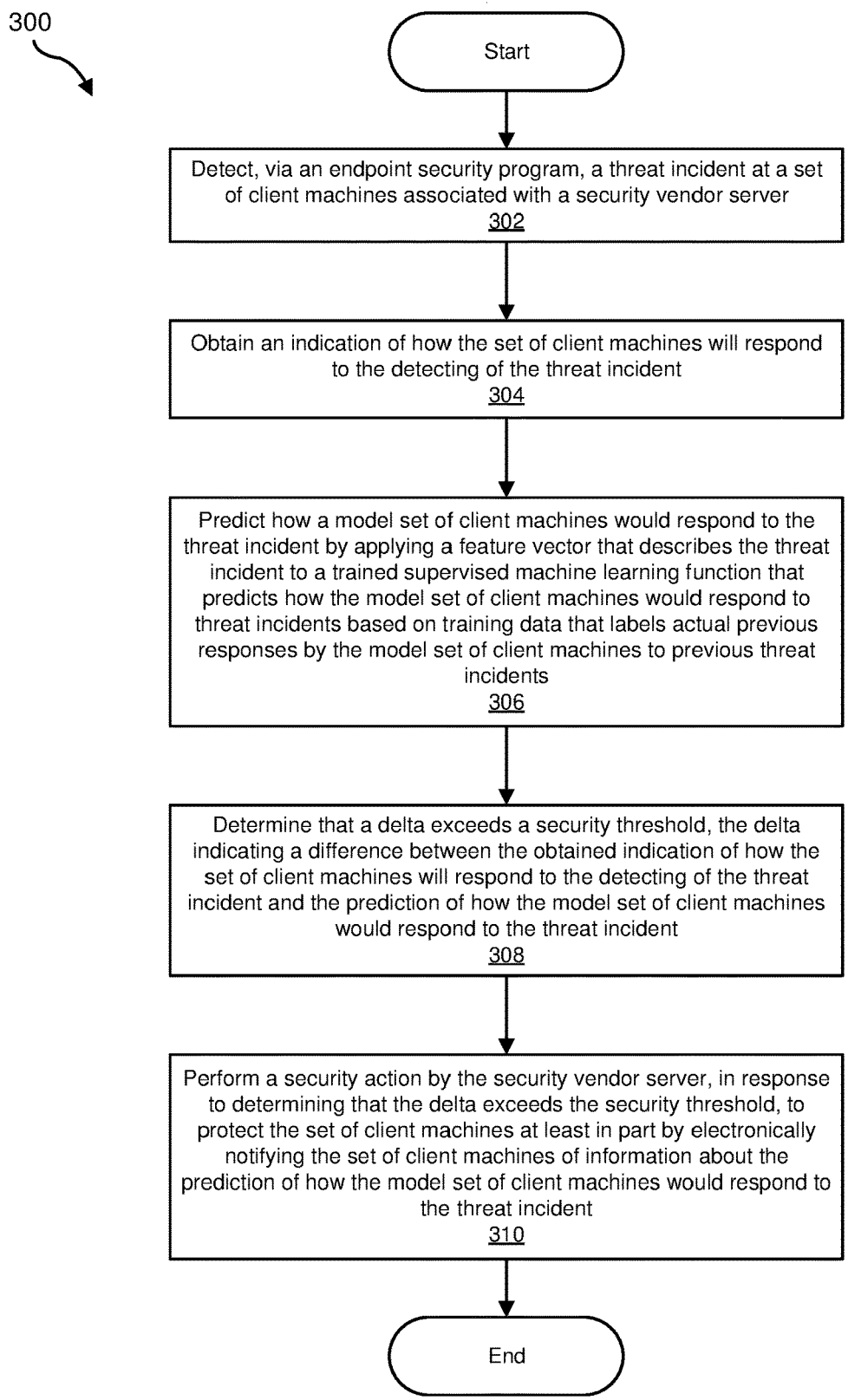
FIG. 3 is a flow diagram of an example method for detecting security blind spots.

FIG. 3 is a flow diagram of an example computer-implemented method 300 for detecting security blind spots. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may detect, through an endpoint security program, a threat incident at a set of client machines associated with a security vendor server. For example, detection module 104 may, as part of security vendor server 206 in FIG. 2, detect, via endpoint security program 122, a threat incident at a set of client machines associated with security vendor server 206.

As used herein, the term "threat incident" generally refers to a candidate security incident as detected or triggered at a corresponding software security product or program. In other words, the software security product or program may implement a policy that defines one or more features or attributes as triggering a candidate security incident, and the software security program or product may trigger or report the candidate security incident upon detecting the corresponding features or attributes (e.g., detecting that a new file or process has features or attributes previously defined as corresponding to malware or another security threat).

As used herein, the term "set of client machines" generally refers to one or more client machines. In example embodiments, the client machines are connected through one or more networks, such as a private enterprise network. In further embodiments, the client machines are all owned or managed, or otherwise correspond to, a single user or customer of the security vendor. For example, an enterprise organization may hire the security vendor to provide protection for all of the computing devices and other computing resources owned and maintained by the enterprise organization, which may all be located within one or more buildings of the enterprise organization or which may include company devices that one or more employees or owners are free to take home from work. Similarly, as used herein, the phrase "detecting a threat incident at a set of client machines" generally refers to detecting a threat incident on at least one client machine, even if other client machines are included within the set and did not similarly detect the same threat incident.

As used herein, the phrase "detect, via an endpoint security program," generally refers to either the endpoint security program detecting the threat incident itself and/or the endpoint security program reporting one or more items of telemetry data to the security vendor server such that the security vendor server, by itself or in coordination with the endpoint security program, thereby detects the threat incident. Additionally, as used herein, the term "security vendor server" generally refers to one or more servers managed by the corresponding security vendor such that the same server need not necessarily perform every corresponding action of method 300 so long as a multitude of servers maintained or managed by the security vendor, in coordination, perform or facilitate method 300, as described further below.

Detection module 104 may detect the threat incident in a variety of ways. In some examples, endpoint security program 122 may, by itself, detect the threat incident and report the detection to detection module 104 within security vendor server 206, as outlined above. In other examples, endpoint security program 122 may simply report telemetry information about events at computing device 202 and/or a status, condition, and/or environment of computing device 202 to security vendor server 206. In response, security vendor server 206, by its own analysis or in coordination with endpoint security program 122, may detect the threat incident. In general, system 100 may detect the threat incident by detecting the presence of one or more features or attributes at one or more client machines, including events, files, processes, and/or corresponding signature detections, or a pattern involving any permutation of these, thereby triggering detection of a corresponding threat incident.

At step 304, one or more of the systems described herein may obtain an indication of how the set of client machines will respond to the detecting of the threat incident. For example, obtaining module 106 may, as part of security vendor server 206 in FIG. 2, obtain indication 124 of how the set of client machines will respond to the detecting of the threat incident.

As used herein, the term "indication of how the set of client machines will respond to the detecting of the threat incident" generally refers to any symbol, category, value, and/or measurement indicating how the set of client machines will respond. For example, the indication may include, or may correspond to, "will try to resolve" or "will not try to resolve" the detected threat incident. The indication may also take the form of any of the labels for labeling how one or more client machines respond to a detected threat incident, as discussed further below in connection with FIG. 4. In some examples, the indication may simply include an indication or description of the action, or lack of action, that the set of client machines will take. In other examples, the indication may include both the indication or description of the action, or lack of action, that the set of client machines will take, as well as an estimated degree of confidence that the indication is correct or accurate (i.e., confidence that the set of client machines will actually take, or not take, the corresponding action). In some examples, the indication and/or the degree of confidence may be measured along a scale from 0 to 10, 0.0 to 1.0, and/or −1.0 to 1.0.

Notably, any one or more of the labels described below in connection with FIG. 4, for example, may take a form or configuration that is parallel to the form or configuration of indication 124, as described above.

Obtaining module 106 may obtain the indication in a variety of ways. For example, obtaining module 106 may obtain the indication of how the set of client machines will respond to the detecting of the threat incident at least in part by receiving an indication of an actual previous response by the set of client machines. As used herein, the term "actual previous response" refers to both actual positive actions taken at computing device 202 as well as an actual lack of positive actions taken at computing device 202 (i.e., where the actual previous response indicates that the client is simply ignoring the threat incident). For example, obtaining module 106 may detect a lack of reports or notifications (e.g., over a period of time) from endpoint security program 122 that would, if reported to obtaining module 106, indicate that endpoint security program 122 has taken one or more actions to address or resolve the detected threat incident.

In a more specific example, obtaining module 106 may detect an actual or positive report or notification from endpoint security program 122 indicating that endpoint security program 122 will not be taking a further action or step to address or resolve the detected threat incident. In further examples, obtaining module 106 may detect an actual or positive report or notification from endpoint security program 122 indicating that endpoint security program 122 received input, from a user or administrator, designating that no further action or step will be taken to address or resolve the detected threat incident. In particular, obtaining module 106 may obtain indication 124 from endpoint security program 122, in which case indication 124 may include a label that a user or administrator at computing device 202 has assigned to the detected threat incident. For example, the label may include one or more of "untouched," "resolved," "false positive," and/or "no action," etc. In further examples, obtaining module 106 may simply detect, previously or in response to the detection of the threat incident, that endpoint security program 122 is configured in a manner such that it will not automatically or autonomously take a further action or step to address or resolve the detected threat incident.

Alternatively, obtaining module 106 may obtain the indication of how the set of client machines will respond to the detecting of the threat incident at least in part by applying a feature vector that describes the threat incident to a trained supervised machine learning function that predicts how the set of client machines would respond to threat incidents based on training data that labels actual previous responses by the set of client machines to previous threat incidents. In other words, the training data may include attributes and information describing previous detected threat incidents, and the training data for one or more threat incidents may be labeled, as described above. The labeled training data may be applied, or input, into a machine learning algorithm, formula, or program, to thereby train a model and/or generate a function that will predict, based on how the client or customer previously labeled detected threat incidents, how the client or customer will label future detected threat incidents. The use of machine learning to train a prediction model will be described in more detail below in connection with step 306 of method 300. Moreover, obtaining module 106 may generally, in this embodiment, obtain the indication of how the set of client machines will respond to the detecting of the threat incident at step 304 in a manner that parallels the use of machine learning at step 306, as discussed further below.

At step 306, one or more of the systems described herein may predict how a model set of client machines would respond to the threat incident by applying a feature vector that describes the threat incident to a trained supervised machine learning function that predicts how the model set of client machines would respond to threat incidents based on training data that labels actual previous responses by the model set of client machines to previous threat incidents. For example, prediction module 108 may, as part of security vendor server 206 in FIG. 2, predict how a model set of client machines would respond to the threat incident by applying a feature vector that describes the threat incident to a trained supervised machine learning function that predicts how the model set of client machines would respond to threat incidents based on training data 126 that labels actual previous responses by the model set of client machines to previous threat incidents.

As used herein, the term "model set of client machines" generally refers to client machines of a corresponding one or more client or customer of the security vendor, and/or one or more client machines of a corresponding one or more threat analyst of the security vendor (e.g., employed by the security vendor), where the security vendor and/or the security vendor server have selected these client machines, from among a larger set of clients or customers of the security vendor, for the performance of step 306. In other words, the "model set of client machines" serve as a "model" in the sense that they are modeling behavior and/or threat incident responses which will be compared, through the machine learning function, with indication 124 obtained for the set of client machines under evaluation to thereby check for a potential blind spot or other statistical outlier behavior, as described further above. The model set of client machines may be selected from among the larger set of client machines based on a variety of different factors, which are discussed further below.

As used herein, the term "feature vector" generally refers to a vector of length one or greater (e.g., a one-dimensional vector having one or more units along the single dimension), where the value at one or more units of the vector describes an attribute or feature of the corresponding detected threat incident. Similarly, the term "trained supervised machine learning function" generally refers to a function or program that accepts, as input, the feature vector, and provides output in the form of a prediction or label about how to respond to the detected threat incident, where the function has been generated by training a model through supervised machine learning. The machine learning is supervised in the sense that the training data is labeled, as described above and described further below. Any suitable supervised machine learning algorithm, formula, and/or program may be used to generate the supervised machine learning function.

Prediction module 108 may predict how the model set of client machines would respond to the threat incident in a variety of ways. In some examples, prediction module 108 and/or the security vendor may generate the trained supervised machine learning function. For example, first the security vendor or prediction module 108 may select the model set of client machines from among a larger set of client machines associated with the security vendor. As used herein, the term "associated with the security vendor" and/or "associated with the security vendor server" generally refers to client machines that are protected through software, services, and/or management by the security vendor and/or security vendor server, respectively. In specific examples, the set of client machines corresponds to one customer of a security vendor that manages the security vendor server.

Also in this example, prediction module 108 selects the model set of client machines from customers of the security vendor. In general, prediction module 108 may select the model set of client machines automatically, autonomously, in coordination with the security vendor, a user, and/or administrator, or through user input from a user and/or administrator.

In a more specific example, prediction module 108 selects the model set of client machines, from among a larger set of client machines associated with the security vendor server, based on a level of engagement with a security system (e.g., system 100) provided by the security vendor server. FIG. 4 shows example training data 126, which further includes two tables, a first table that begins with a list of incidents on the left, and a second table below the first table, the second table beginning with a list of customers on the left. As shown in the second table, training data 126 may include a "level of engagement" that further specifies a measurement or quantification of the level of engagement of the corresponding customer at each respective row with the security system (e.g., system 100) and services provided by the security vendor. More specifically, the level of engagement may specify a measurement or quantification of an amount or frequency of labeling actions that the corresponding customer performs to label responses to detected threat incidents (e.g., labels shown in the Customer Response Code column of the top table in training data 126). In additional or alternative examples, the level of engagement may also measure a degree of uniformity, a degree of variety, and/or a degree of meaningfulness of the label responses made by the corresponding customer to thereby distinguish between customers that meaningfully engage with the system by accurately assigning labels and those that do not meaningfully engage the system (i.e., by assigning the same level to all or most all detected threat incidents regardless of accuracy).

Figure 4:
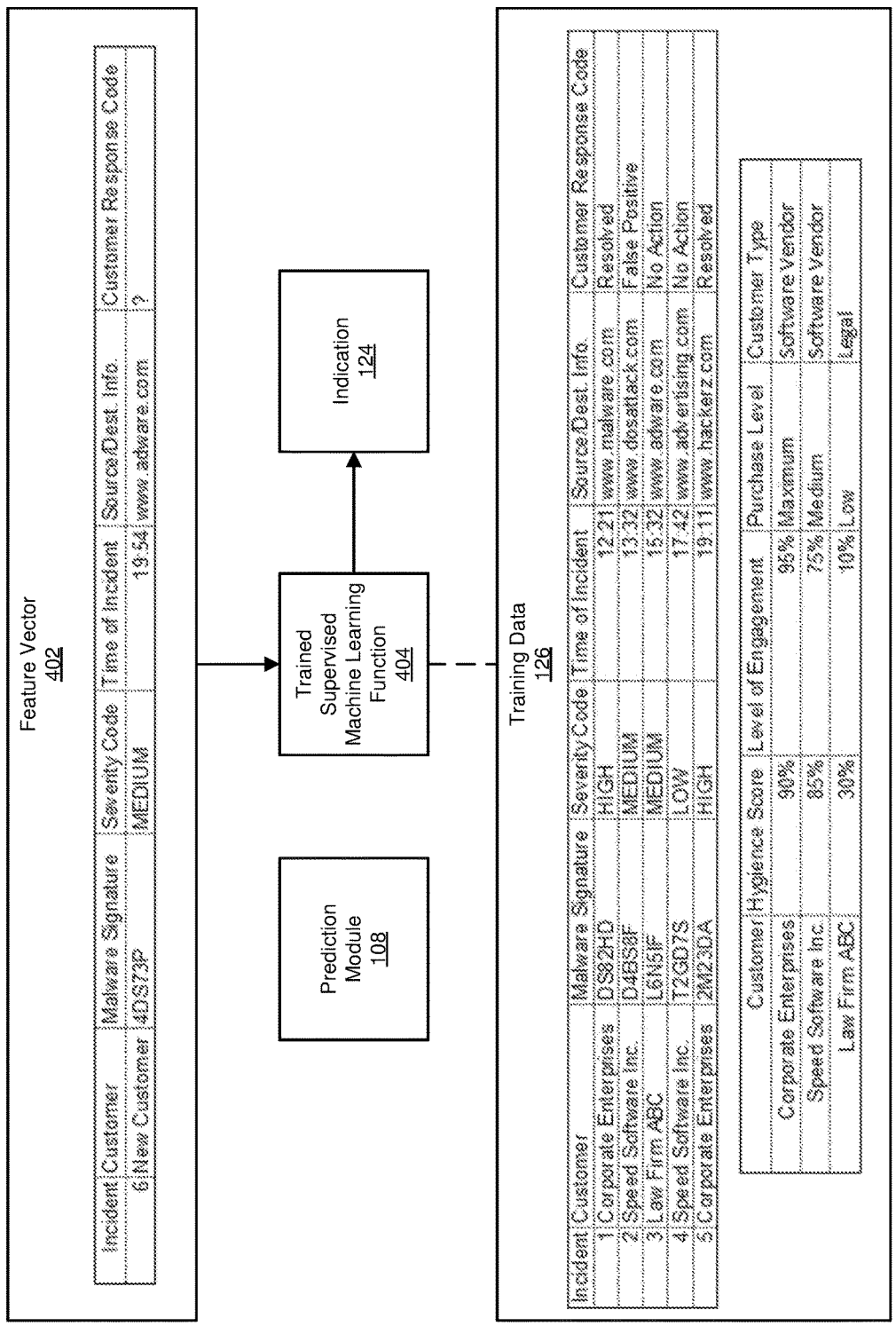
FIG. 4 is a block diagram of example training data.

In the example of FIG. 4, the level of engagement is specified in terms of a percent. Nevertheless, any suitable symbol, categorization, and/or numerical scale may be used to indicate the measure of the level of engagement. As further shown in this example, a first customer, Corporate Enterprises, has a level of engagement of 95%. A second customer, Speed Software Inc., has a level of engagement of 75%. A third customer, Law Firm ABC, has a level of engagement of 10%. In view of the above, the third customer Law Firm ABC is a relative outlier from among the entirety of these three customers. Notably, in this toy example, there are only three customers, but in a real-life practical example the data set may include dozens, hundreds, thousands, millions, and/or billions of customers and/or incidents (or any suitable intervening degree or number of customers and/or incidents). More specifically, Law Firm ABC has a level of engagement of only 10%, which indicates that Law Firm ABC is rarely engaging with system 100 or actively labeling responses to detected threat incidents. Accordingly, prediction module 108 may select the first two customers while omitting the third customer Law Firm ABC for the model set of client machines. More specifically, prediction module 108 may use a threshold of 70% as a cutoff level of engagement to define the selection of the model set of client machines from among a larger set of client machines. Nevertheless, this particular cutoff threshold is arbitrary and may be selected by prediction module 108 and/or the security vendor in any manner that suits the performance of method 300.

In additional or alternative examples, prediction module 108 may select the model set of client machines, from among a larger set of client machines associated with the security vendor server, based on a calculated degree of similarity to the set of client machines for which the indication is obtained. In these examples, prediction module 108 may detect or measure one or more features or attributes of corresponding customers, which may correspond to binary values, categories, and/or measurements along a numerical scale, and then apply these to one or more similarity calculations or formulas to measure a degree of similarity between two or more prospective customers. Any suitable feature or attribute may be used by prediction module 108 to measure the degree of similarity. In the simplified example of FIG. 4, prediction module 108 may simply categorize one or more customers according to a customer type, as shown in the customer type column of the table on the bottom of training data 126. As shown in this table, the first two customers have the customer type of "software vendor" and the third customer has the customer type of "legal."

In view of the above, in this simplified example, the first two customers are more similar to each other and different from the third customer, whereas the third customer is notably different from both of the first two customers. Accordingly, if prediction module 108 would perform step 306 of method 300, for one of the first two customers, to predict how a model set of client machines would react to the threat incident, then prediction module 108 may select the other of the first two customers for the model set of client machines, because the first two customers are similar to each other. Similarly, in this simplified example, prediction module 108 may exclude the third customer from the model set of client machines.

Additionally or alternatively, prediction module 108 may select the model set of client machines, from among a larger set of client machines associated with the security vendor server, based on a relative security score that indicates a relative degree of security hygiene of the model set of client machines in comparison to other client machines in the larger set. As further shown in FIG. 4, the bottom table in training data 126 may include a column "hygiene score" that indicates a security hygiene score, in the form of a percentile. In this example, the security hygiene score in the form of the percentile may indicate a proportion or percentile of customers within a set (e.g., some or all customers of the security vendor). For example, Corporate Enterprises has a hygiene score of 90%, which indicates that Corporate Enterprises has an underlying hygiene score or performance that is in the top 10% of customers within a corresponding data set (e.g., some or all customers of the security vendor). Although the hygiene score in this example takes the form of a percentile that indicates a top proportion of performance, in other examples the hygiene score may take any suitable form as a symbol, category, and/or measurement along any suitable scale, which may indicate (in additional or alternative embodiments) any suitable absolute or relative measurement of security hygiene or performance.

As first described above, in additional or alternative embodiments, the model set may include one or more client machines of a corresponding one or more threat analyst of the security vendor (e.g., employed by the security vendor). A security vendor, such as SYMANTEC, may employ some of the best threat analysts in the world. These threat analysts may be responsible for the publishing of incidents to customers (and further adjusting or modifying settings, preferences, and/or prioritizations, as discussed further below). Accordingly, in some embodiments, the model set may supplement or replace customer client machines with security vendor threat analyst machines. In either case (customer model machines and security vendor threat analyst machines), the disclosed systems and methods may select these machines to function as a model for comparison with the set of client machines under evaluation. For example, a top performing customer (e.g., with high levels of engagement and/or low levels of infection) may model how to respond to a threat incident detection. In a parallel manner, the security vendor's own threat analysists may also model how to respond to a threat incident detection.

Returning to step 306, prediction module 108 may predict how the model set of client machines would respond to the threat incident by applying a feature vector to a corresponding trained supervised machine learning function. For example, prediction module 108 may apply a feature vector 402 (or a variation of feature vector 402 formed by any permutation of the elements within feature vector 402 in any order) to a trained supervised machine learning function 404. Prediction module 108 may train or generate supervised machine learning function 404 using any suitable machine learning generation-function or program based on some or all of training data 126 as input, as first described above. As further shown in FIG. 4, training data 126 may include, within the top table, information in various fields or columns that each describe a respective threat incident.

More specifically, in the example of FIG. 4, the rows of the first table correspond to detected threat incidents and the remaining columns extending to the right correspond to various features or attributes measured or detected for each threat incident, including a customer identifier, a malware signature or other security signature, a severity code corresponding to the malware signature, a time of the incident (which may specify seconds, minutes, hours, day of the week, date, and/or any other suitable timing information, including start, stop, and/or duration information), source/destination information, and/or a customer response code. The customer response code may correspond to the label that endpoint security program 122 detects on computing device 202 and/or that the corresponding user or administrator assigns to the detected threat incident, as further described above. Because the incidents within the top table of training data 126 are labeled in this manner, training data 126 thereby can serve as training data for a supervised machine learning function as distinct from an unsupervised machine learning function.

Accordingly, when prediction module 108 selects the model set of client machines, and thereby excludes one or more customers, prediction module 108 may eliminate incident information within the top table (or corresponding data structure) within training data 126 that corresponds to the one or more excluded customers, thereby leaving only incident information describing incidents at the selected customers for inclusion within the model set (i.e., the model set of client machines corresponding to the selected customers or clients). For example, if prediction module 108 selected Corporate Enterprises and Speed Software Inc. for inclusion within the model set of client machines, but not the third customer, Law Firm ABC, then prediction module 108 may eliminate the row(s) or data structure(s) within training data 126 that describe detected threat incidents at the third customer. Prediction module 108 may then generate trained supervised machine learning function 404 using the revised training data 126 that includes information describing threat incidents at the first two customers but does not include information describing threat incidents at the third customer. Of course, prediction module 108 may also equivalently eliminate unselected rows or data structures by simply copying or inserting the selected rows or data structures into a new data set, thereby achieving the same result.

At step 308, one or more of the systems described herein may determine that a delta exceeds a security threshold. The delta may indicate a difference between the obtained indication of how the set of client machines will respond to the detecting of the threat incident and the prediction of how the model set of client machines would respond to the threat incident. For example, determination module 110 may, as part of security vendor server 206 in FIG. 2, determine that a delta exceeds a security threshold.

As used herein, the term "delta" generally refers to any result of a comparison operation between two corresponding values. The delta may take the form of a binary comparison (e.g., equivalent "yes" or "no"), a symbol or category indicating a type or level of similarity, and/or a numerical measurement along a scale indicating a degree of similarity. Similarly, the security threshold may include any arbitrary level or condition suitable for comparison with the delta and suitable for detecting blind spots in accordance with method 300, as discussed further below.

Determination module 110 may determine that the delta exceeds a security threshold in a variety of ways. In some examples, the security threshold may simply correspond to any deviation from exact sameness, such that if indication 124 corresponds to an action, or lack of action, that is not the same as the action, or lack of action, predicted for the model set of client machines at step 306, then the security threshold is exceeded. In other examples, the security threshold may specify a numerical value along a range, and the delta may exceed the security threshold if the delta specifies a numerical value along the same range, or corresponding range, that numerically exceeds the security threshold. In some examples, determination module 110 may determine whether the delta exceeds the security threshold using a complex or multi-factor function, business logic, and/or algebraic logic that provides a binary output (i.e., exceeded or not exceeded) based upon the two corresponding inputs (i.e., indication 124 from step 304 and the prediction from step 306).

At step 310, one or more of the systems described herein may perform a security action, as part of the security vendor server, in response to determining that the delta exceeds the security threshold, to protect the set of client machines at least in part by electronically notifying the set of client machines of information about the prediction of how the model set of client machines would respond to the threat incident. For example, performance module 112 may perform a security action, as part of security vendor server 206, to protect the set of client machines at least in part by electronically notifying the set of client machines, through notification 250, of information about the prediction of how the model set of client machines would respond to the threat incident.

As used herein, the term "security action" generally refers to any suitable action that the security vendor server may take, automatically, autonomously, and/or in cooperation with user or administrator input, designed to protect computing device 202 from the detected threat incident. Examples of the security action, in addition to the electronic notification described further below, may include enabling or disabling a security feature, updating a signature set, rebooting a device (e.g., rebooting into a safe mode), installing or updating an endpoint security program, adjusting a security setting, heightening a level of security protection, powering down, disconnecting, deleting, quarantining, and/or sandboxing one or more computing resources, etc. Moreover, some of these actions may be triggered by the security vendor server remotely such that the corresponding actions are performed on computing device 202. Additionally, in some examples, the security server vendor may autonomously trigger the security action whereas in other examples, the security server vendor may simply prompt a user or administrator at the set of client machines (e.g., within notification 250) about whether the user or administrator chooses to perform the security action in accordance with a recommendation or suggestion.

As used herein, the term "electronically notifying the set of client machines" generally refers to automatically, autonomously, and/or in coordination with manual input, transmitting a text message, network packet or message, email, pop-up, Internet notification, or signal to generate a machine-crafted physical mail letter, or any other corresponding or suitable textual message (or audio or video message). Moreover, as used herein, the term similarly refers to transmitting the electronic notification to any member of the set of client machines and/or any corresponding user or administrator for the set of client machines who may receive the notification on behalf of the client machines in accordance with method 300.

Additionally, as used herein, the term "information about the prediction of how the model set of client machines would respond to the threat incident" generally refers to any information that performance module 112 gathers, prepares, and/or generates, in response to step 310, that is related to the prediction of step 306 (e.g., information generated at step 306 and/or information on which the prediction of step 306 is based) and transmitted to the set of client machines in an effort to protect the set of client machines from the corresponding detected threat incident (i.e., by warning the set of client machines about a detected blind spot, as described above and further described in the examples below).

Figure 5:
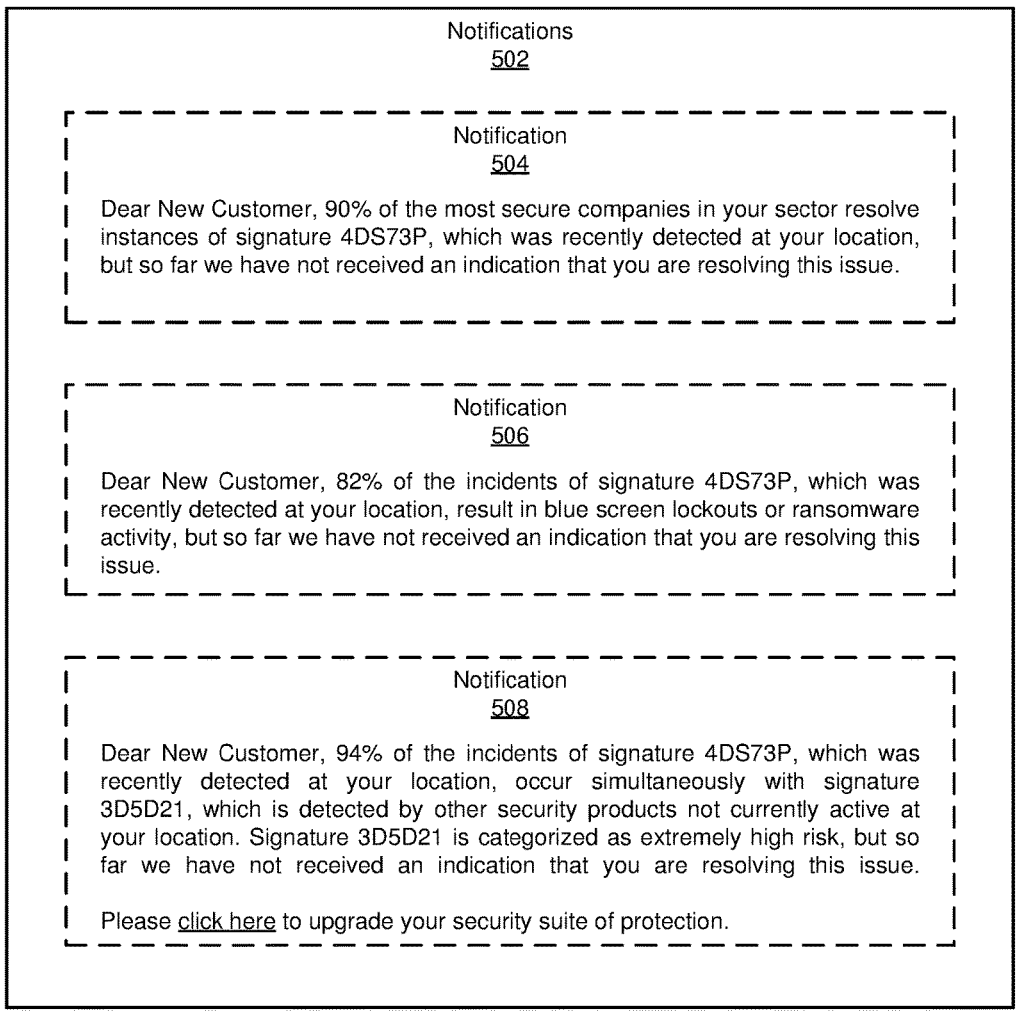
FIG. 5 is a block diagram of example notifications.

Performance module 112 may perform the security action in a variety of ways. FIG. 5 shows example notifications 502, which include a notification 504, notification 506, and a notification 508, as discussed further below. In some examples, performance module 112 may electronically notify the set of client machines of information about the prediction of how the model set of client machines would respond to the threat incident at least in part by electronically notifying the set of client machines that the set of client machines is currently ignoring the threat incident even though other client machines in the model set of client machines addressed parallel instances of the threat incident. For example, in notification 504, performance module 112 transmits a message that states: "Dear New Customer, 90% of the most secure companies in your sector resolve instances of signature 4 DS73P, which was recently detected at your location, but so far we have not received an indication that you are resolving this issue." Notably, as used herein, the term "parallel instance" of a threat incident generally refers to another instance of the same threat incident (e.g., as defined by the same detection pattern or signature) or an instance of another threat incident that is defined by security vendor server 206, within a corresponding security policy, as analogous to, parallel to, and/or a family member of the same threat incident.

Similarly, in additional or alternative examples, performance module 112 may electronically notify the set of client machines of information about the prediction of how the model set of client machines would respond to the threat incident at least in part by electronically notifying the set of client machines that the threat incident leads to a specific negative security outcome identified through the training data. For example, in notification 506, performance module 112 transmits a message that states: "Dear New Customer, 82% of the incidents of signature 4 DS73P, which was recently detected at your location, result in blue screen lockouts or ransomware activity, but so far we have not received an indication that you are resolving this issue."

Additionally or alternatively, performance module 112 may electronically notify the set of client machines of information about the prediction of how the model set of client machines would respond to the threat incident at least in part by electronically notifying the set of client machines about further contextual information about other instances of the threat incident identified through the training data. For example, in notification 508, performance module 112 transmits a message that states: "Dear New Customer, 94% of the incidents of signature 4 DS73P, which was recently detected at your location, occur simultaneously with signature 3D5D21, which is detected by other security products not currently active at your location. Signature 3D5D21 is categorized as extremely high risk, but so far we have not received an indication that you are resolving this issue."

More generally, performance module 112 may electronically notify the set of client machines by leveraging insights from other client machines, which may include endpoint security programs or products that are not available on the set of client machines under evaluation. For example, one set of client machines, such as the new customer addressed in FIG. 5, may only have implemented one endpoint security product, which detects signature 4 DS73P but which does not or cannot detect another signature 3D5D21, even though other security products implemented on other client machines can detect both of the signatures and further tend to detect both of them simultaneously according to a statistical analysis, as further described in notification 508. Additionally, as also described in notification 508, performance module 112 may include an option or invitation within the notification regarding upgrading a service, product, and/or version provided by the security vendor (e.g., a service, product, and/or version that would have detected a signature or threat incident that the endpoint security product currently implemented on computing device 202 failed to detect).

The three notifications of FIG. 5 are merely examples. In general, performance module 112 may electronically notify the set of client machines by transmitting a notification that includes, or is based on, any permutation of the following items of information: (i) any measure of deviation between behavior and/or preferences of the set of client machines under evaluation and another set of client machines, (ii) any contextual information, such as co-occurring signature detections or other features of a feature vector (such as feature vector 402) that are detected at parallel instances of the detected threat incident but that are not necessarily detected at the set of client machines under evaluation, (iii) a proportion, number, and/or any other identifying information about other client machines (one, some, and/or all of the model set of client machines) and how they responded to parallel instances of the detected threat incident, and/or (iv) any measurement or quantification of a risk level or severity level of the detected threat incident, especially if the measurement or quantification is based on telemetry or machine learning data that the endpoint security program potentially lacks on its own without the notification.

The above discussion provided a comprehensive overview of method 300 of FIG. 3. Additionally, the following discussion provides a more concrete and detail-specific overview of one or more embodiments of the disclosed systems and methods. For some products that protect customers based on telemetry data collected from other customers, and/or based on remote server-client interaction, including for example ADVANCED THREAT PROTECTION (ATP) and MANAGED SECURITY SERVICES (MSS) by SYMANTEC, a security vendor and/or corresponding server can show analysts security events that they can respond to or ignore. After prioritizing and personalizing these events, potential problems can develop because the security vendor and/or security server can be recommending incidents that the security vendor thinks an analyst will respond to, thereby de-prioritizing potentially important incidents. In this way, the efforts by the security vendor or security server to provide a prioritizing and/or personalizing experience for the customer (e.g., omitting or de-prioritizing events in which the client has indicated a lack of interest) can nevertheless reinforce bad, undesired, and/or misguided behavior by the client or customer (e.g., in the case that the client or customer has a blind spot). However, based on other responses from other analysts/companies to similar security events, the security vendor or security server can identify high priority events and encourage analysts to understand that these are blind spots that they should be handling better, which may thereby raise their overall security posture.

The disclosed systems and methods may identify relevant companies/users from a larger customer base which may be used as exemplars. The disclosed systems and methods may leverage the wisdom of those customers to help guide and highlight recommendations for security events that are worth responding to and help educate other customers about why they may want to respond to those events.

The disclosed systems and methods may reference a dataset that includes features extracted from incidents, including: (i) the company where the incident occurred (to help the model learn company-specific bias), (ii) signatures/events that occur in the incident along with signature information, (iii) a severity code of the incident, (iv) timing information, (v) source/destination information and/or machine information where the incident occurred, and/or (vi) a response code provided by customers as a known label (untouched, resolved, false positive, no action, etc.). Given this information, the disclosed systems and methods generate a feature vector for each incident in the incident database, and use the response code as a label for the incident.

According to a general machine learning approach, the disclosed systems and methods may leverage a global (e.g., security vendor customer base wide) view across customers, and the disclosed systems and methods may thereby train a model which enables the disclosed systems and methods to make strategic recommendations for how other companies should be responding to security events. In particular, the disclosed systems and methods may train a global model including data from a "meaningful" or "model" set of companies, as further described above in connection with FIG. 3, and then apply a description of a threat incident for one company to the trained model, which indicates the wisdom of the crowd. If the wisdom of the crowd overwhelmingly suggests (e.g., by satisfying a statistical measurement and corresponding threshold), that this incident should be handled, and a specific company is not resolving the incident, then the disclosed systems and methods can identify this situation and suggest remediation.

The set of "meaningful" or "model" companies can be defined or selected by the disclosed systems and methods as those that satisfy one or more of the following properties: (i) any company which actively engages with the system and provides any responses/labels, (ii) companies with somewhat balanced response rates across the various labels (i.e., does not only resolve incidents, or does not mark all as no-action, but is more engaged with the system in a useful way, by showing varying and/or meaningful response/labeling), (iii) companies that are similar to the company under evaluation or protection, as described further above in connection with FIG. 3 (e.g., based on a comparison of similar or same industry, size, and/or geography, etc.), and/or (iv) companies with the best overall hygiene (lowest infection level or rate based on knowledge from an endpoint protection product, such as SYMANTEC ENDPOINT PROTECTION, lowest amount of spam/CNC traffic coming from their INTERNET PROTOCOL block, etc.). The disclosed systems and methods may also use this last factor to identify engaged customers that also have a good overall security posture as measured or quantified by the security vendor server according to a suitable metric or threshold.

The disclosed systems and methods may thereby engage customers in one or more of the following manners. The disclosed systems and methods may encourage customers to reconsider their bias against dangerous incidents that they are inclined to ignore through the following methods: (i) peer pressure (e.g., "X % of high hygiene companies in your sector resolve this threat incident and you are ignoring it"), (ii) tying incidents to outcomes (e.g., "this threat incident X leads to a more serious infection Y 90% of the time when ignored"), and/or (iii) tying incidents to additional context that may not be present for this particular instance of the incident under evaluation (e.g., because the customer is lacking a product), but which could help to motivate a response and/or upgrade. In additional or alternative examples, the security vendor or security vendor server may adjust or modify settings, preferences, and/or prioritizations (e.g., those indicating which detected threat incidents to report to a customer, an order in which to report them, and/or a level or degree of highlighting or emphasis to place on them) based on the results of steps 306 and 308, as described above, without necessarily asking or notifying the customer (or upon prompting the customer and receiving approval).

Figure 6:
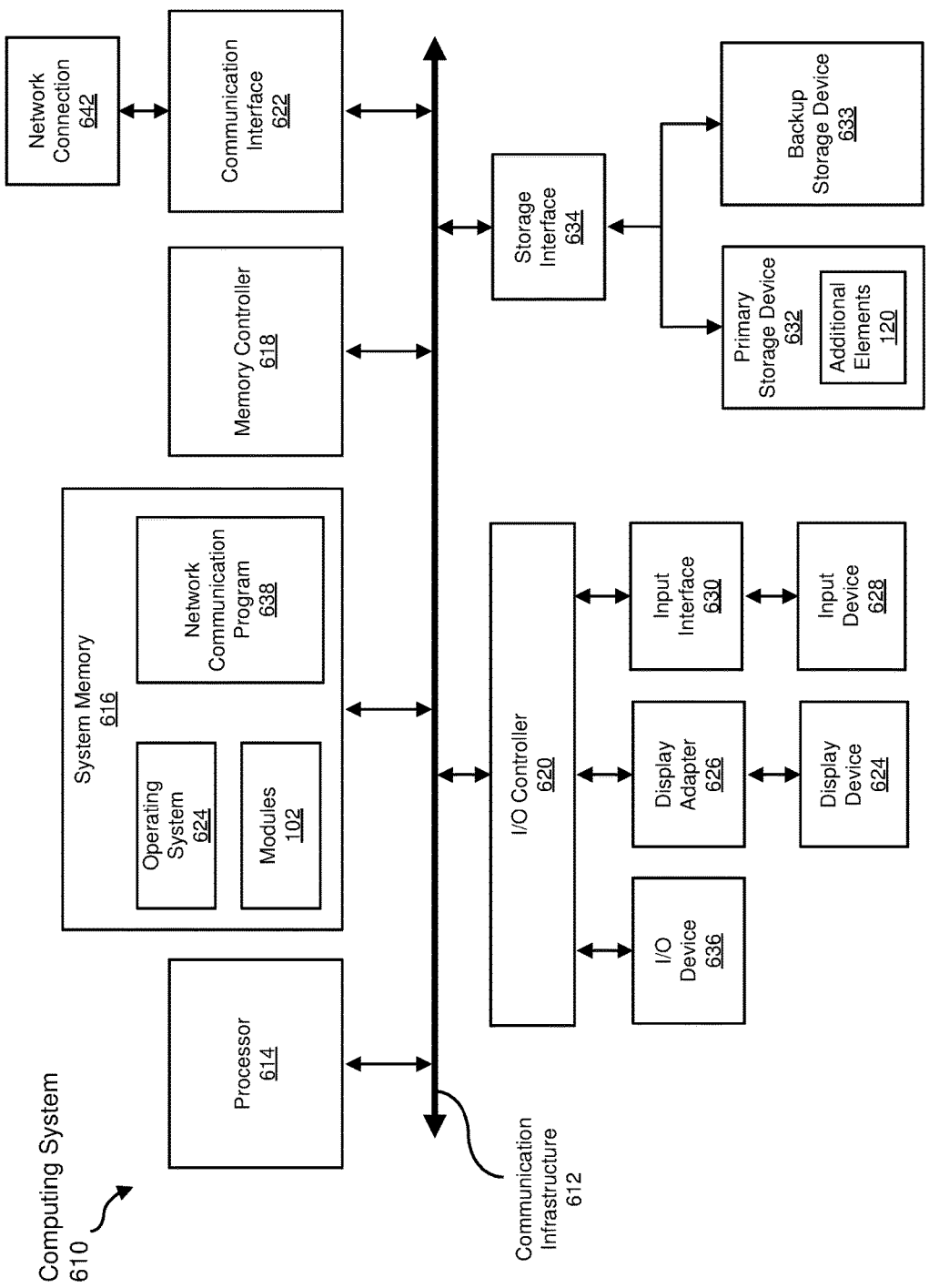
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 624 for execution by processor 614. In one example, operating system 624 may include and/or represent software that manages computer hardware and software resources and/or provides common services to computer programs and/or applications on computing system 610. Examples of operating system 624 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, additional elements 120 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
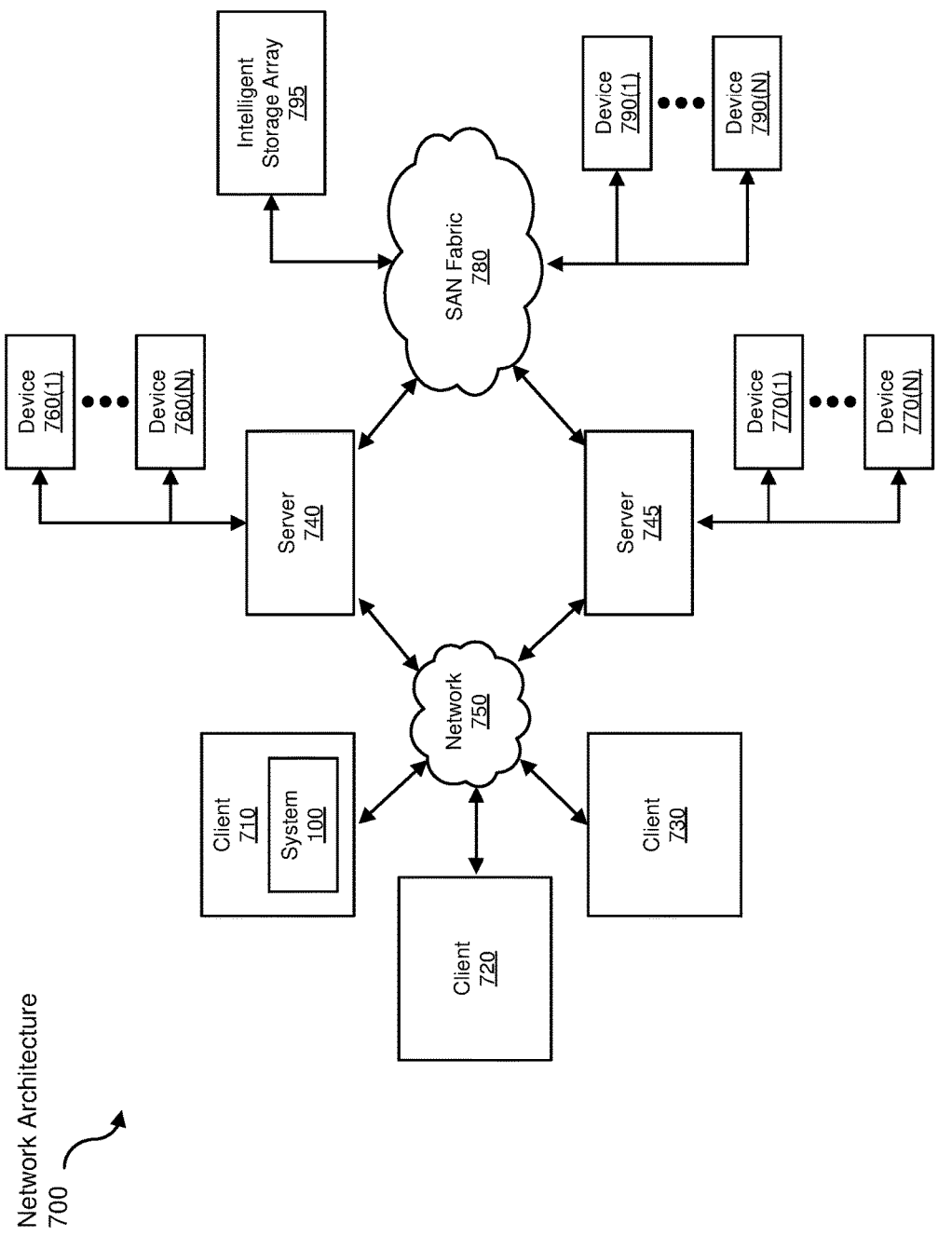
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for detecting security blind spots.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive customer preferences, telemetry data, and/or security settings or policies, to be transformed, transform one or more of these items of information, output a result of the transformation to a display, storage device, or other output device, use the result of the transformation to protect security vendor customers from security blind spots, and/or store the result of the transformation to a paper hard copy, memory, and/or disk. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting security blind spots, at least a portion of the method being performed by a computing device comprising at least one processor, the method comprising:
    detecting, via an endpoint security program, a threat incident at a set of client machines associated with a security vendor server;
    obtaining an indication of how the set of client machines will respond to the detecting of the threat incident;
    predicting how a model set of client machines would respond to the threat incident by applying a feature vector that describes the threat incident to a trained supervised machine learning function that predicts how the model set of client machines would respond to threat incidents based on training data that labels actual previous responses by the model set of client machines to previous threat incidents;
    determining that a delta exceeds a security threshold, the delta indicating a difference between the obtained indication of how the set of client machines will respond to the detecting of the threat incident and the prediction of how the model set of client machines would respond to the threat incident; and
    performing a security action by the security vendor server, in response to determining that the delta exceeds the security threshold, to protect the set of client machines at least in part by electronically notifying the set of client machines of information about the prediction of how the model set of client machines would respond to the threat incident.

2. The computer-implemented method of claim 1, wherein obtaining the indication of how the set of client machines will respond to the detecting of the threat incident comprises receiving an indication of an actual previous response by the set of client machines.

3. The computer-implemented method of claim 1, wherein obtaining the indication of how the set of client machines will respond to the detecting of the threat incident comprises applying the feature vector that describes the threat incident to a trained supervised machine learning function that predicts how the set of client machines would respond to threat incidents based on training data that labels actual previous responses by the set of client machines to previous threat incidents.

4. The computer-implemented method of claim 1, wherein:
    the set of client machines corresponds to one customer of a security vendor that manages the security vendor server; and
    the security vendor selected the model set of client machines from customers of the security vendor.

5. The computer-implemented method of claim 1, wherein the model set of client machines are selected, from among a larger set of client machines associated with the security vendor server, based on a level of engagement with a security system provided by the security vendor server.

6. The computer-implemented method of claim 1, wherein the model set of client machines are selected, from among a larger set of client machines associated with the security vendor server, based on a calculated degree of similarity to the set of client machines for which the indication is obtained.

7. The computer-implemented method of claim 1, wherein the model set of client machines are selected, from among a larger set of client machines associated with the security vendor server, based on a relative security score that indicates a relative degree of security hygiene of the model set of client machines in comparison to other client machines in the larger set.

8. The computer-implemented method of claim 1, wherein electronically notifying the set of client machines of information about the prediction of how the model set of client machines would respond to the threat incident comprises electronically notifying the set of client machines that the set of client machines is currently ignoring the threat incident even though other client machines in the model set of client machines addressed parallel instances of the threat incident.

9. The computer-implemented method of claim 1, wherein electronically notifying the set of client machines of information about the prediction of how the model set of client machines would respond to the threat incident comprises electronically notifying the set of client machines that the threat incident leads to a specific negative security outcome identified through the training data.

10. The computer-implemented method of claim 1, wherein electronically notifying the set of client machines of information about the prediction of how the model set of client machines would respond to the threat incident comprises electronically notifying the set of client machines about further contextual information about other instances of the threat incident identified through the training data.

11. A system for detecting security blind spots, the system comprising:
 a detection module, stored in memory, that detects, via an endpoint security program, a threat incident at a set of client machines associated with a security vendor server;
 an obtaining module, stored in memory, that obtains an indication of how the set of client machines will respond to the detecting of the threat incident;
 a prediction module, stored in memory, that predicts how a model set of client machines would respond to the threat incident by applying a feature vector that describes the threat incident to a trained supervised machine learning function that predicts how the model set of client machines would respond to threat incidents based on training data that labels actual previous responses by the model set of client machines to previous threat incidents;
 a determination module, stored in memory, that determines that a delta exceeds a security threshold, the delta indicating a difference between the obtained indication of how the set of client machines will respond to the detecting of the threat incident and the prediction of how the model set of client machines would respond to the threat incident;
 a performance module, stored in memory as part of the security vendor server, that performs a security action, in response to determining that the delta exceeds the security threshold, to protect the set of client machines at least in part by electronically notifying the set of client machines of information about the prediction of how the model set of client machines would respond to the threat incident; and
 at least one physical processor configured to execute the detection module, the obtaining module, the prediction module, the determination module, and the performance module.

12. The system of claim 11, wherein the obtaining module obtains the indication of how the set of client machines will respond to the detecting of the threat incident by receiving an indication of an actual previous response by the set of client machines.

13. The system of claim 11, wherein the obtaining module obtains the indication of how the set of client machines will respond to the detecting of the threat incident by applying the feature vector that describes the threat incident to a trained supervised machine learning function that predicts how the set of client machines would respond to threat incidents based on training data that labels actual previous responses by the set of client machines to previous threat incidents.

14. The system of claim 11, wherein:
 the set of client machines corresponds to one customer of a security vendor that manages the security vendor server; and
 the prediction module selects the model set of client machines from customers of the security vendor.

15. The system of claim 11, wherein the prediction module selects the model set of client machines, from among a larger set of client machines associated with the security vendor server, based on a level of engagement with the system provided by the security vendor server.

16. The system of claim 11, wherein the prediction module selects the model set of client machines, from among a larger set of client machines associated with the security vendor server, based on a calculated degree of similarity to the set of client machines for which the indication is obtained.

17. The system of claim 11, wherein the prediction module selects the model set of client machines, from among a larger set of client machines associated with the security vendor server, based on a relative security score that indicates a relative degree of security hygiene of the model set of client machines in comparison to other client machines in the larger set.

18. The system of claim 11, wherein the performance module electronically notifies the set of client machines of information about the prediction of how the model set of client machines would respond to the threat incident at least in part by electronically notifying the set of client machines that the set of client machines is currently ignoring the threat incident even though other client machines in the model set of client machines addressed parallel instances of the threat incident.

19. The system of claim 11, wherein the performance module electronically notifies the set of client machines of information about the prediction of how the model set of client machines would respond to the threat incident at least in part by electronically notifying the set of client machines that the threat incident leads to a specific negative security outcome identified through the training data.

20. A non-transitory computer-readable medium comprising one or more computer-readable instructions that, when executed by at least one processor of a computing device, cause the computing device to:

detect, via an endpoint security program, a threat incident at a set of client machines associated with a security vendor server;

obtain an indication of how the set of client machines will respond to the detecting of the threat incident;

predict how a model set of client machines would respond to the threat incident by applying a feature vector that describes the threat incident to a trained supervised machine learning function that predicts how the model set of client machines would respond to threat incidents based on training data that labels actual previous responses by the model set of client machines to previous threat incidents;

determine that a delta exceeds a security threshold, the delta indicating a difference between the obtained indication of how the set of client machines will respond to the detecting of the threat incident and the prediction of how the model set of client machines would respond to the threat incident; and perform a security action, in response to determining that the delta exceeds the security threshold, to protect the set of client machines at least in part by electronically notifying the set of client machines of information about the prediction of how the model set of client machines would respond to the threat incident.

* * * * *